May 5, 1959  J. C. COSLEY  2,885,218
STEERING MECHANISM FOR FOUR-WHEEL TRAILER
Filed Sept. 4, 1957  2 Sheets-Sheet 2

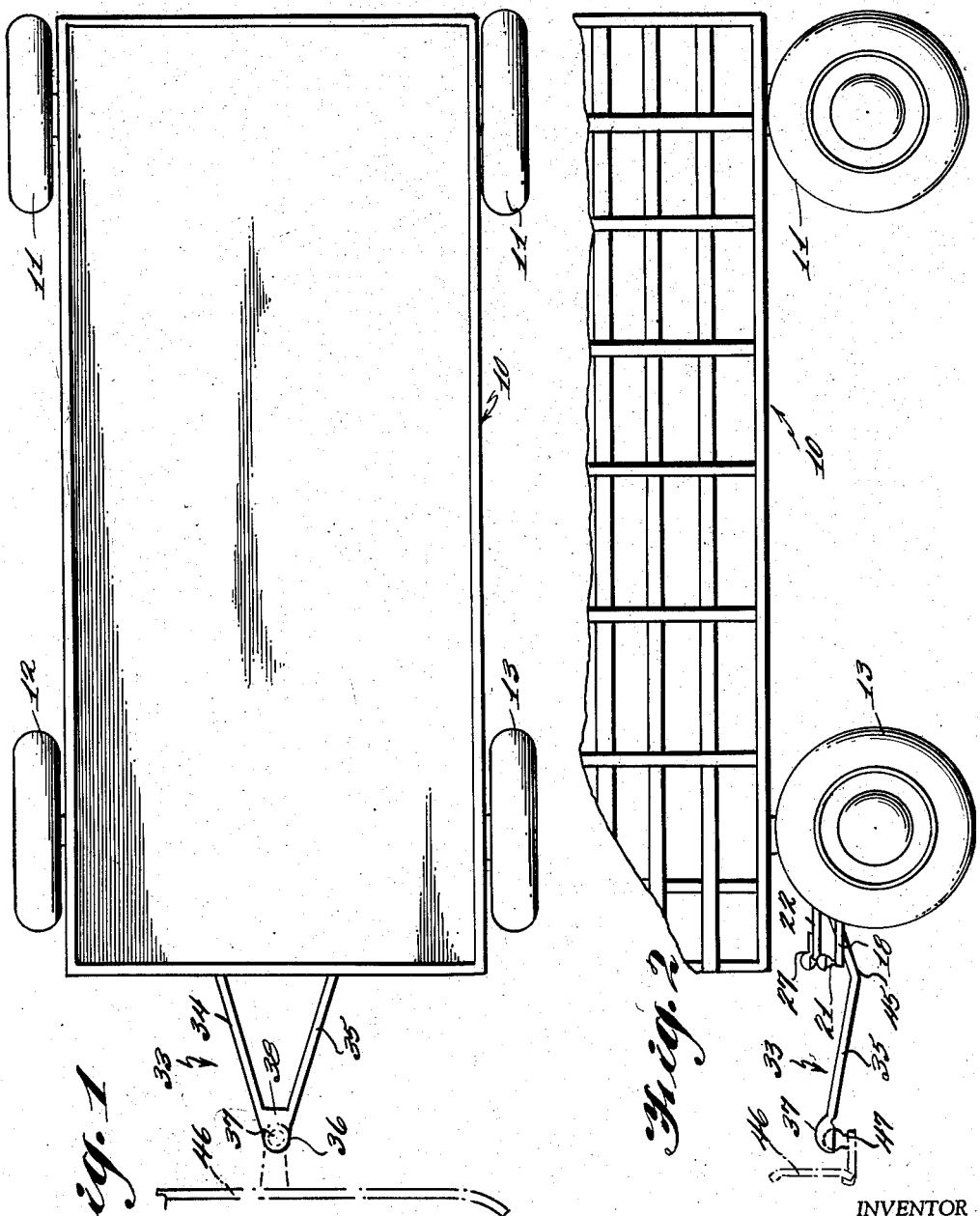

INVENTOR
J. C. COSLEY
BY Kimmel & Crowell
ATTORNEYS

United States Patent Office 2,885,218
Patented May 5, 1959

2,885,218

STEERING MECHANISM FOR FOUR-WHEEL TRAILER

James C. Cosley, Worland, Wyo.

Application September 4, 1957, Serial No. 682,039

4 Claims. (Cl. 280—103)

The present invention relates to steering mechanisms for four-wheel trailers, and more particularly to such mechanisms operating on a steering knuckle principle.

The primary object of the invention is to provide a steering mechanism for trailers in which the towing forces are directly transmitted to the front axle of the vehicle and the steering wheels are controlled directly from the draft mechanism.

Another object of the invention is to provide a steering mechanism for trailers in which the tow bar is mounted on a horizontal pivot so that the outer end thereof may be raised and lowered without varying the steering control of the trailer.

A further object of the invention is to provide a steering mechanism for trailers in which a relatively light wishbone type draw bar is pivotally carried by the draft mechanism.

A still further object of the invention is to provide a steering mechanism for four-wheel trailers which is inexpensive to manufacture, positive in its action, and is easy to maintain when in service.

Other objects and advantages will become apparent in the following specification when considered in the light of the attached drawings, in which:

Figure 1 is a plan view of a four-wheel trailer incorporating the invention.

Figure 2 is a side elevation of the trailer with the invention shown attached thereto.

Figure 4:
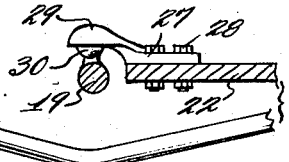
Figure 4 is a fragmentary enlarged longitudinal cross-section taken along the line 4—4 of Figure 3, looking in the direction of the arrows.
Figure 3:
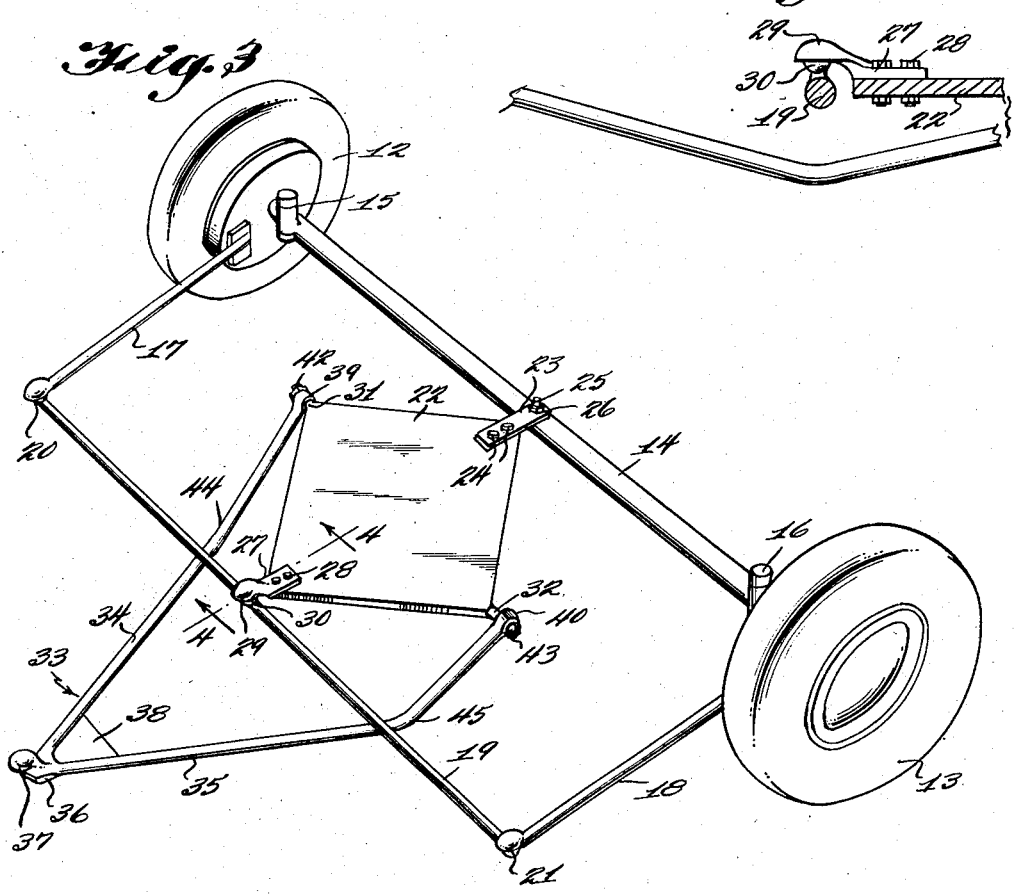
Figure 3 is a perspective view of the front wheel structure and steering mechanism therefor.
Figure 5:
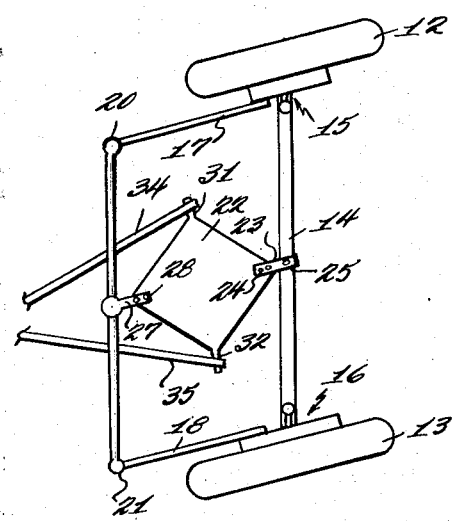
Figure 5 is a plan view of the steering mechanism illustrated in Figure 3.

Referring now to the drawings in detail wherein like reference characters indicate like parts throughout the several figures, the reference numeral 10 indicates generally a four-wheel trailer incorporating the invention.

The trailer 10 is supported on a conventional rear wheel structure 11 and a pair of front wheels 12 and 13. An axle 14 extends transversely of the trailer 10 between the wheels 12 and 13 and is connected to the wheels 12 and 13 by steering knuckles indicated, respectively, at 15 and 16.

The wheel 12 is provided with a forwardly extending steering arm 17, and the wheel 13 is provided with a forwardly extending steering arm 18. The steering arms 17 and 18 extend parallel to each other and have their forward ends joined by a tie rod 19. Conventional ball joint tie rod ends 20 and 21 connect the steering arms 17 and 18, respectively, to the opposite ends of the tie rod 19. The tie rod 19 is parallel to the axle 14 and forms with the steering arms 17 and 18 a parallelogram pivoted at each corner, as previously described.

A diamond shaped plate 22 is positioned between the tie rod 19 and the axle 14 and has a connector bar 23 connected to one corner thereof and extending rearwardly therefrom. The connector bar 23 is secured to the diamond plate 22 by means of a bolt 24. A bolt 25 is welded to the axle 14 and extends upwardly therefrom with a rear end of the bar 23 journalled thereon and secured thereto by a nut 26.

A connector 27 is secured to the corner of the diamond plate 22 diagonally opposite the bar 23 by means of a bolt 28, or any other suitable means. The connector 27 has a ball joint socket 29 formed on its forward end and connected to a ball mounting pin 30 secured to the center of the tie rod 19, as best shown in Figure 4.

The diamond plate 22 is provided with projecting journal pins 31 and 32 on its remaining diagonally opposite corners. The pins 31 and 32 are axially aligned and have their axis arranged perpendicularly to the axis extending through the corners carrying the bar 23 and the connector 27.

A wish-bone draw bar, indicated generally at 33, is provided with a pair of forwardly converging arms 34 and 35 joined at their forward ends to a plate 36 having a conventional trailer socket 37 incorporated therewith. A brace plate 38 extends between the forward ends of the arms 34 and 35 to assist in bracing the mechanism. The arm 34 is provided with a journal portion 39 at its rear end, and the arm 35 is provided with a journal portion 40 at its rear end.

The journal portions 39 and 40 are engaged over the pins 31 and 32, respectively, and secured thereon by nuts 42 and 43, respectively. The arms 34 and 35 are offset at 44 and 45, respectively, so that they can extend forwardly from the diamond plate 22 without contacting the tie rod 19, as best shown in Figure 2.

In the use and operation of the invention, the draw bar 33 is connected to a towing vehicle, a portion of which is shown at 46, through a ball 47 mounted thereon so that the draw bar 33 is pivotally connected to the vehicle. In towing the trailer 10 through the draw bar 33, the towing forces are transmitted through the arms 34 and 35, journal pins 31 and 32, diamond plate 22, bar 23, bolt 25, to the axle 14.

The steering arms 17 and 18 and the tie rod 19 are moved to steer the trailer 10 by swinging the draw bar 33 from one side to the other, pivoting the diamond plate 22 about the pivot bolt 25 so that the connector 27 will move the tie rod 19. Obviously, the tie rod 19 and steering arms 17 and 18 have none of the towing forces transmitted therethrough, thus eliminating excessive wear on the tie rod ends 20 and 21, and the socket 29 and pin 30.

Having thus described the preferred embodiment of the invention, it should be understood that numerous structural modifications and adaptations may be resorted to without departing from the scope of the appended claims.

What is claimed is:

1. A steering mechanism for four-wheel trailers comprising a front axle extending transversely of said trailer, a pair of steering knuckles pivotally secured to opposite ends of said axle, wheels journalled on said steering knuckles, steering arms secured to and extending forwardly from said steering knuckles in spaced parallel relation, a rigid tie rod parallel to said axle extending between the forward ends of said steering arms and pivotally connected thereto, a plate, a pivot transversely aligned with said steering knuckles pivotally securing said plate to said axle, a second pivot transversely aligned with the pivotal connections between said tie rod and said steering arms pivotally securing said plate to said tie rod, a draw bar extending forwardly from said plate, and means pivoting said draw bar to said plate intermediate said axle and said tie rod for movement in a vertical plane whereby with said draw bar connected to said plate rearwardly of the connection of said plate to said tie rod direct strain on said tie rod from said plate and said draw bar is avoided when pulling said trailer.

2. A device as claimed in claim 1 wherein said plate is of diamond shape and said pivots connecting said plate to said axle and said tie bar are arranged at diagonally opposite corners of said plate.

3. A device as claimed in claim 2 wherein the means pivotally connecting said draw bar to said plate comprises axially aligned journal pins fixedly secured to said plate and extending from diagonally opposite corners of said plate with said draw bar having a pair of diverging arms provided with means at the terminal end thereof for pivotally connecting said arms to said journal pins respectively.

4. A device as claimed in claim 1 wherein said draw bar includes a pair of rearwardly diverging arms having their rear ends pivotally connected to laterally spaced points on said plate.

References Cited in the file of this patent

UNITED STATES PATENTS

| 1,087,210 | Bryan | Feb. 17, 1914 |
| 1,812,768 | Berggren | June 30, 1931 |
| 2,459,753 | Brown | Jan. 18, 1949 |

FOREIGN PATENTS

| 411,035 | Great Britain | May 31, 1934 |